BINARY STRIPE CODING SYSTEM AND APPARATUS

Filed Jan. 30, 1967 4 Sheets-Sheet 1

INVENTOR

DONALD D. LEUCK

BY Browne, Schuyler & Beveridge

ATTORNEYS

Nov. 24, 1970 D. D. LEUCK 3,543,241

BINARY STRIPE CODING SYSTEM AND APPARATUS

Filed Jan. 30, 1967 4 Sheets-Sheet 2

INVENTOR
DONALD D. LEUCK

BY Browne, Schuyler & Beveridge

ATTORNEYS

Nov. 24, 1970 D. D. LEUCK 3,543,241

BINARY STRIPE CODING SYSTEM AND APPARATUS

Filed Jan. 30, 1967 4 Sheets-Sheet 3

INVENTOR

DONALD D. LEUCK

BY Brown, Schuyler & Beveridge

ATTORNEYS

BINARY STRIPE CODING SYSTEM AND APPARATUS

Filed Jan. 30, 1967 4 Sheets-Sheet 4

INVENTOR
DONALD D. LEUCK

BY Browne, Schuyler & Beveridge
ATTORNEYS

United States Patent Office 3,543,241

Patented Nov. 24, 1970

3,543,241 BINARY STRIPE CODING SYSTEM AND APPARATUS

Donald D. Leuck, Toledo, Ohio, assignor to Owens-Illinois, Inc., a corporation of Ohio Filed Jan. 30, 1967, Ser. No. 612,573
Int. Cl. G06f *3/08*
U.S. Cl. 340—172.5 9 Claims

ABSTRACT OF THE DISCLOSURE

A coding system and apparatus for processing articles such as containers, tubing, and the like. Binary information is carried by stripe widths (wide-narrow), the stripes being printed on the article against a contrasting background. A flying light spot traverses the stripes and an optical pickup detects variations in reflection and supplies a series of electrical pulses proportional (wide-narrow) to stripe widths, to a memory and digital processing unit which simultaneously detects and stores binary information and produces control signals for the further handling of the articles. The system is self-synchronous and separate time synchronization and precise printing of code markings on the articles and location thereof on the articles is not required. Consult the specification for details and other features.

This invention relates to a coding system and apparatus and, more particularly, a strip coding system for articles and a reading station for reading stripe code to derive information therefrom.

The object of the present invention is to provide an improved stripe coding system and apparatus utilizing same with respect to articles moving along a path.

The invention has general utilization with regard to article processing systems but will be described in connection with tubing used in the manufacture of pharmaceutical syringes, and containers for drugs, medicines and the like where precision control over the containers receiving such drugs is highly desirable. Suppliers of drugs go to great lengths to assure that containers for their drugs are properly labeled and that packages of containers labeled for one drug contain containers which are likewise properly labeled. While manufacturers do take many steps to avoid distribution of even one improperly labeled product, occasionally an improperly labeled container is distributed and in the case of drugs such distribution can be serious. In general, while various forms of binary coding have been successfully utilized in this art, prior art binary coding systems and apparatus have, in general, required a degree of precision which complicate and limit their use. The invention has specific application in the pharmaceutical field, but, it is not particularly limited thereto as the invention may be applied to systems for control of any article moving along without limitations to article or use.

In accordance with the invention a series of stripes are printed on an article on a contrasting background, there always being a stripe for a given permutative code position, with the stripes being wide or narrow to signify a binary "one" or a binary "zero." Such stripes are scanned by a flying light spot scanner and variations in reflected light are detected to produce electrical pulses which are normalized into square wave shapes, the width of each resulting electrical pulse $e(t)$ being proportional to the width of a stripe causing same. While a separate pulse detector may be used to identify a wide pulse (or a narrow pulse) and apply same along with detected narrow (or wide) pulses to a storage unit for translation of the binary information, a preferred method is to take the complement of the pulses $-e(t)$ and delay $(\tau d)$ the pulses and their respective complements equal amounts greater than the width of a narrow pulse but less than the width of a wide pulse then apply the delayed pulses $$e(t-\tau d) \text{ and } -e(t-\tau d)$$

as the "J" and "K" inputs of a "J–K" flip-flop and apply the complement $-e(t)$ as the trigger input to the "J–K" flip-flop. This action simultaneously converts a wide pulse into its assigned binary significance. (In this application, wide stripes signify a binary "one.") The "J–K" flip flop is the first stage of a series of cascaded JK flip-flops forming a shift register which stores the binary digits. Thus, in addition to decoding the pulses, the shift register also stores the binary information carried by the wide and narrow pulses. As each succeeding pulse is applied to the first stage of the register, the binary data stored therein is shifted to the next succeeding stage.

After a set of stripes has been read and stored in the register as a pattern of ones and zeros corresponding to the stripe pattern permutation, the binary information may be translated into control information by comparing the binary pattern stored in the shift register with information stored in a memory. The control information may be in the form of a "go-no go" signal. For example, where the system is used to detect an improperly marked or labeled drug container moving along a conveyor carrying containers marked or labeled for one particular drug, the control information will be a signal to stop the conveyor. This will require an operator to go through certain procedures in order to reinstitute operation. Such procedures may include making a written record of the event and details thereof. Of course, the control information may cause automatic removal of a container, or the information may be fed to a computor or like apparatus.

The invention, together with other advantages and features thereof, will be best understood from the following description when read in conjunction with the accompanying drawings:

FIG. 1*a* illustrates the stripe coding concept of the invention and FIG. 1*b* illustrates the four possible code permutations, detector outputs corresponding thereto and the detected pulse patterns after amplification and shaping of same;

FIG. 2*a* and FIG. 2*b* diagrammatically illustrate the flying light spot scanning system and detector or pickup systems, respectively;

Figure 3:
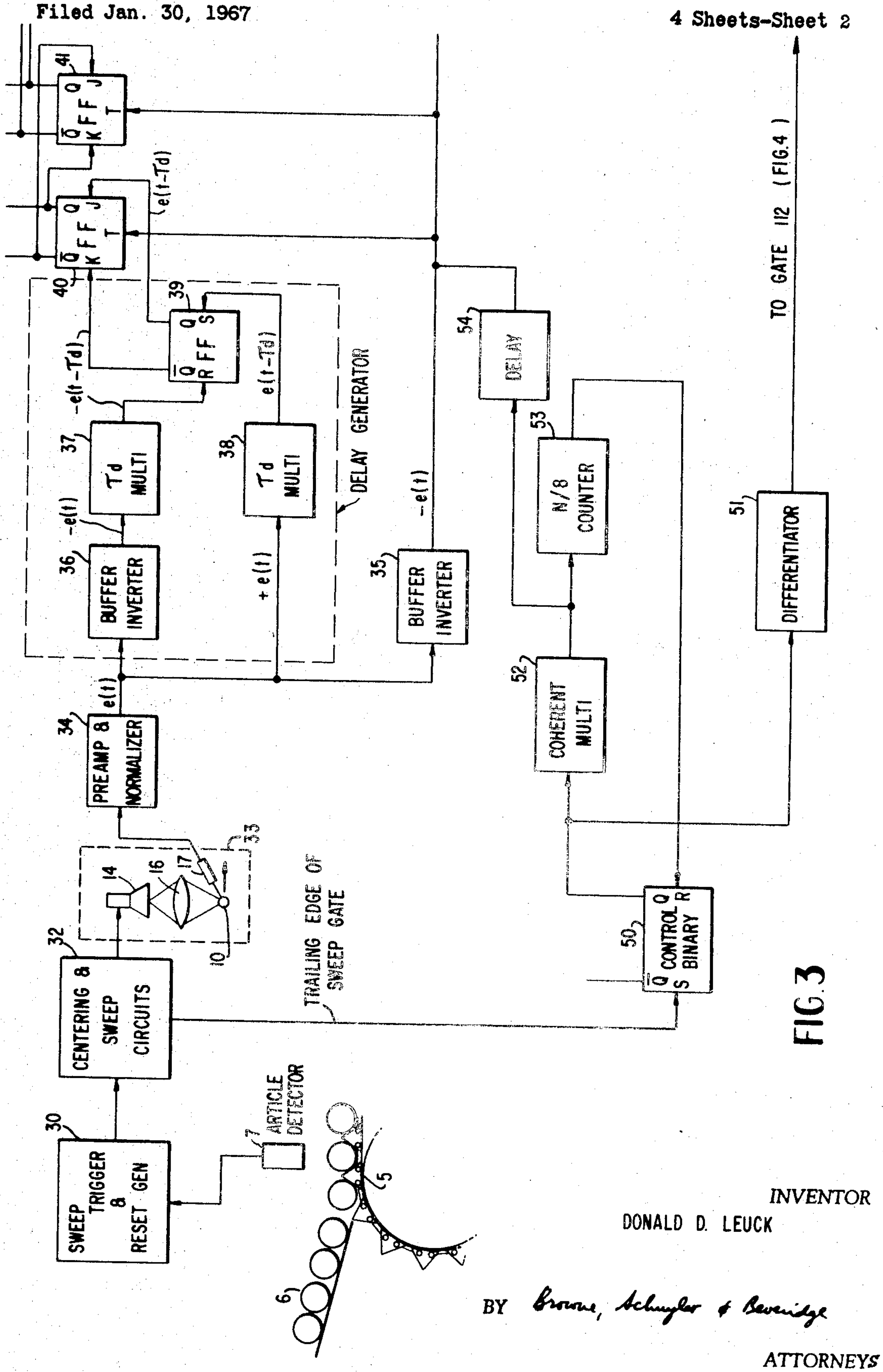
FIG. 3 shows details of the control and decoding apparatus including the storage means therefor.
Figure 5:
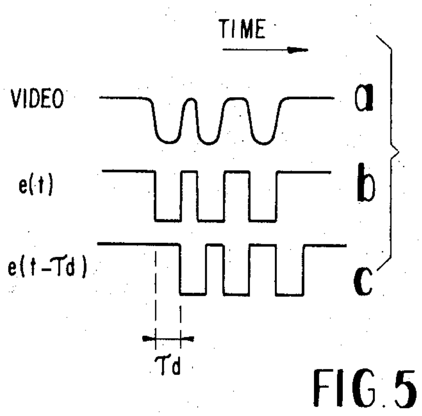

FIGS. 5*a*–5*c*, inclusive, illustrate the wave forms present in FIG. 3; and

FIGS. 6*a*–6*g*, inclusive, show the decoding and storage of pulse patterns and how the shift register is cleared for receiving new information.

Figure 1A:
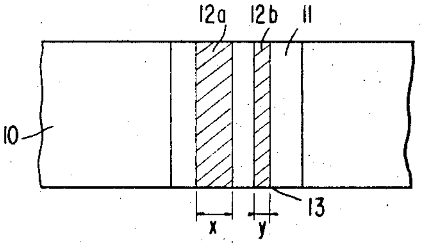
Figure 1B:
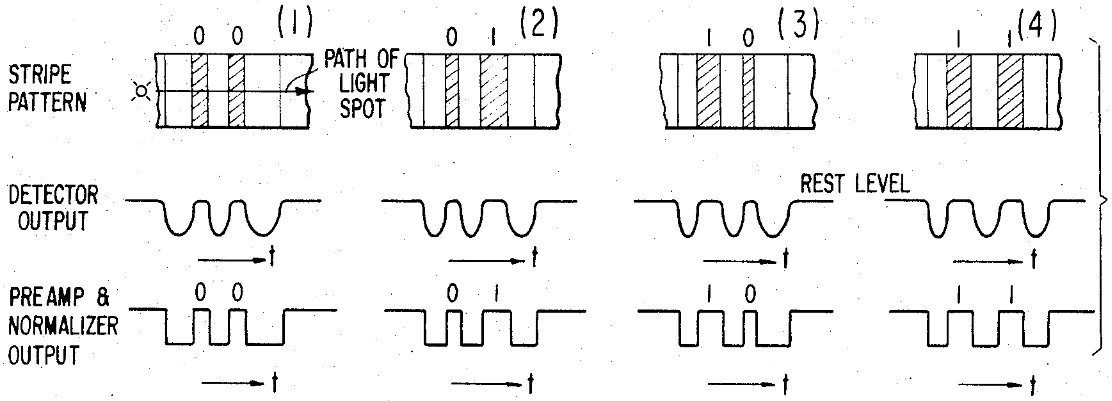

With reference now to FIG. 1*a* of the drawings, an enlarged fragmentary portion of a tubular glass article 10 is shown as having printed thereon by any conventional printing technique a broad background stripe 11, which may be of any contrasting color but preferably is a white background, and a pair of code stripes 12*a* and 12*b*. Only two such stripes are shown for simplicity purposes but it will be appreciated that the number of such stripes may be increased to any desired number, thus increasing the number of possible distinct code permutations in accordance with the well known formula $2^N$ where N is the number of stripes used. Two different width stripes are used, a narrow stripe denotes binary "zeroes" and a wide stripe denotes binary "ones." I have chosen to designate the wider stripe as being a binary one, it being understood that in some cases the narrow stripe may be designated a binary one. Thus, with respect to a two stripe coding, four code permutations are possible namely, 0,0, 0,1, 1,0 and 1,1. This code is printed on the white background 11 as a narrow stripe-narrow stripe, a narrow stripe-wide stripe, a wide stripe-narrow stripe, or a wide stripe-wide stripe corresponding, respectively, to the binary code coding (see FIG. 1*b*). (The pulses shown are on an expanded time base, each pulse width being equal to $X/R$ or $Y/R$ where X is the width of a wide stripe, Y is the width of a narrow stripe and R is tthe speed of the light spot.) It is important to note that there is always a stripe printed on the article for each possible permutative code position.

In printing the stripes on the article, precision printing of the stripes at the particularly precise locations on the article are not necessary and, in fact, elimination of a need for precise location of the stripes on the white background or article is one distinct advantage of this invention. However, since the stripe widths are made to carry the code designations, and since the lines code stripes may be quite narrow on tubular articles, it is desirable when printing the stripes on the article that the stripes do not completely encircle the article. The reason for this is that, should there be a lack of precision in the printing or shape of the article, the ends of the stripe may not meet precisely. Thus what was intended to be a narrow stripe may have the width of a wide stripe at the point of overlap in the printing operation. Accordingly, while it is not necessary, it may be desirable to leave a very small gap between the ends of the stripe, where they meet so that slightly skew printed lines would not register as a double line and thus give a false indication as to what the code printed on the article was actually intended to be. Such a gap or spacing between the ends of the stripes where they terminate is designated by the numeral 13 in FIG. 1*a*.

While the coding is illustrated with respect to a cylindrical glass article, it will be appreciated that the invention can be applied equally well to flat objects and articles and surfaces. The stripes can be as narrow as the capability of the printing apparatus dictates. For pharmaceutical tubing having a background band 11 about 5.5 millimeters long, there may be six code stripes about 0.5 millimeter wide for a wide stripe and about 0.3 millimeter wide for a narrow stripe.

It is also of some significance to point out that with regard to the feature of not requiring precise positioning of the code stripes with respect to the article (except that it be at a general location that comes within view of the reading apparatus), due to the fact that there is always a stripe (whether wide or narrow) at each code position, there is no need or requirement for precise spacing between stripes since, as it will appear more fully hereinafter, the system is self-synchronous and does not require any independent clocking mechanism for reading the coding.

FLYING LIGHT SPOT SCANNING

Figure 2A:
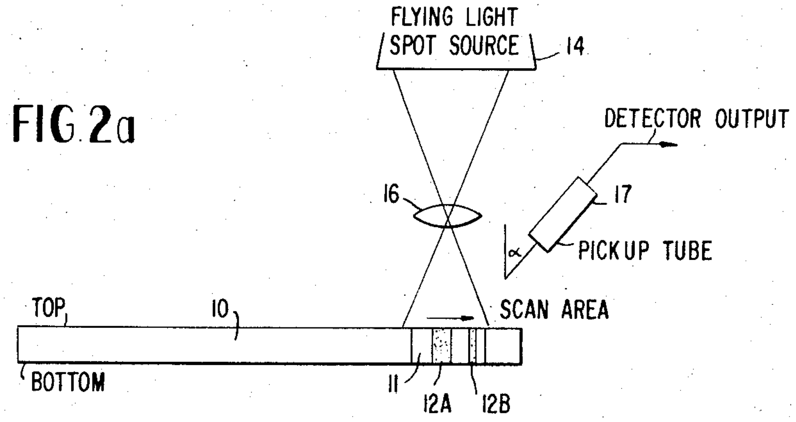
Figure 2B:
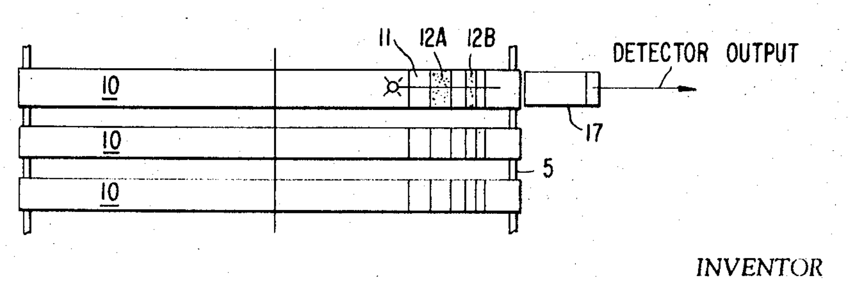

Tubing, such as pharmaceutical tubing, having imprinted thereon a selected set of wide and/or narrow stripes according to a predetermined code permutation assigned for tubing destined to have certain drug filled therein, or already filled with that drug, are moved along a path through the reading station by a conveyor chain 5 (FIG. 3) which receives from supply 6. In FIG. 2, glass tubing 10 is shown in the scanning position and the scanning may be initiated by the article upon its arrival at the scanning position. It should be appreciated that tubing 10, as shown, is not stationary but is continuously moving through the system and is not stopped for the reading of the code thereon, although, the system is applicable with equal facility to a system wherein the article is stopped at the scanning station for a reading operation. Each scanning operation is initiated by the article. As illustrated in FIG. 3, each time an article is transferred to conveyor 5 a signal is generated in detector 7 to initiate a scanning operation when that article becomes positioned beneath tube 14. In case the detector is in advance of the scanning station such signal may be stored for delivery when the article is at the scanning position. The form of conveyor is not pertinent to the present invention.

The stripe codes 12*a* and 12*b* on the white background 11 are traversed by a flying spot of light from a cathode ray tube 14, the flying light spot from cathode ray tube 14 being focused by a lens structure 16 onto the tubing. As illustrated, the light spot is caused to scan the code area of tube 10 from left to right. However, obviously right to left sweeping of the light spot may be utilized.

The flying light spot from the cathode ray tube 14 is caused to sweep or move at a constant speed R and along a fixed straight line once for each code reading or scanning cycle. Intensity variations in the reflected light occur due to the striping and these intensity variations contain the essential information contained in the code. The pickup tube 17 therefore is set at an angle alpha ($\alpha$) with respect to the tubing so that it does not pick up relatively diffuse reflections as, for example, are present due to the reflective properties of, say, a glass tubing which carries the stripe coding, or where the articles are carried past the scanning station in packages containing cellophane or other reflective materials overlying the articles.

The output of pickup tube 17 is a series of pulses (wave form A FIG. 5) which are applied to a preamplifier and pulse normalizer circuit 34. Preamplifier and pulse normalizer circuit 34 amplifies and shapes the input video pulses to square wave pulses (line B FIG. 5). These pulses have a width W corresponding to the width of the stripe, the width shown being related to the sweep speed of the flying light by the relation $TW=W/R$ where TW is the time width of the electrical pulse, W is the stripe width and R is the speed of the light spot.

DELAY GENERATOR

The delay generator (enclosed within dotted block in FIG. 3) receives the wave form $e(t)$ (wave form B, FIG. 5) from preamplifier and normalizer circuit 34. These pulses are applied to an inverter 36 to produce a negative replica or complement $-e(t)$ of the pulses representing a scanning of the stripe code on a white background. The positive wave form of pulses $e(t)$ and the negative wave form $-e(t)$ are delayed $\tau_d$ (by multivibrators 37 and 38, respectively). The delayed pulses $$-e(t-\tau_d),\ e(t-\tau_d)$$

are applied to a flip-flop circuit 39 (reset input R of flip-flop circuit 39 is the wave form minus $e(t-\tau_d)$ and the "set" input is plus $e(t-\tau_d)$). The pulses in these wave forms still retain the same relative width as the stripes. Flip-flop 39 operates on negative edges or excursions of the two input waves, which, in terms of reference, are the "trailing edges."

Delayed wave forms are the logical "J" and "K" inputs to the first stage 40 of a shift register. The stages of the shift register are cascaded JK flip-flop elements. the JK flip-flop elements are effective on the positive excursions of the wave and this circuit, the positive excursions of the $-e(t)$ wave from buffer inverter 35 is applied to the trigger input "T" of the first and all succeeding stages of the shift register. As explained more fully hereinafter, when the delayed wide pulses occur during a positive excursion, a "one" is stored in the register because of coincidence at the JK inputs of equal pulses.

The time delay $\tau_d$ is greater than the narrow pulse but less than the wide pulse.[1] By adjusting $\tau_d$ the circuit can be made to accept varying pulse widths, that is, varying the stripe width. Since control of the pulse measurement is made a function of each pulse, the system is self-timing or self-synchronous and precise stripe spacing or positioning is not critical. The only element of synchronism involved is in the triggering of the sweep trigger generator by the conveyor or articles carried thereby so as to initiate a scanning operation.

Flip-flop 40 of the shift register has its output logical ($\bar{Q}$, Q) terminals connected to the logical input (J. K) terminals of the next succeeding stage 41 of the shift register and, the trigger input comprises the $-e(t)$ pulses. Thus, for each stripe detection there is a trigger input to all stages of the shift register. With respect to the first stage, however, the inputs are directly derived from the pulses as derived in the delay generator. The succeeding stages, however, receive their inputs from the preceding stage by conventional shifting techniques of a shift register.

It will be appreciated that the first stage 40 of the shift register simultaneously serves two basic functions. It is in this stage that wide pulse detection is accomplished. At the same time, this stage serves to store such pulses for transfer to the next succeeding stage. Thus, there is no independent detection of a wide or narrow pulse, as such, prior to applying the wave forms to the first stage 40 of the shift register. It is to be understood that with respect to other aspects of the invention separate detection and storage means may be utilized in place of simultaneous detection and storage.

The trigger input to the shift registers are obtained from the buffer inverter circuit 35 which receives the output of preamplifier and normalizer circuit 34 and inverts same so as to provide on the trigger terminals of the shift register a $-e(t)$ wave form. (It may be noted that this same signal may be obtained as an output of inverter 36.)

REGISTER READOUT AND TRANSLATING CIRCUITS

The trailing edges of the cathode ray tube sweep voltage are utilized to trigger a control binary 50 which is a binary flip-flop (the trailing edges are applied to the "set" input of this flip-flop so that this flip-flop stage is "on" until reset).

The leading edge of the voltage appearing at the Q terminal of control binary 50 is differentiated in a differentiator circuit 51 and utilized to turn on a comparison logic section which compares the data stored in the shift register with a stored pulse pattern corresponding to an acceptable code. If the binary number stored in the register compares, position for position, with the preset code or pulse pattern set up in the memory (switch type memory) a signal issues from the comparison circuitry to allow the conveyor to continue its operation. If the binary digits in the register do not match with the memory, everything is stopped, lights are operated, an alarm is sounded and a record made.

Control binary 50 is also used to turn on a free running coherent multivibrator 52 (an electronic switch in the circuit of one stage of the coherent transistor multivibrator 50 is normally off so that that side of the multivibrator is up e.g. high voltage on collector, and the other side is down e.g. conducting so that the collector voltage is near ground). When the switch is turned on by a signal from the control binary, the multivibrator reverses state so that the first output starts with a positive excursion which is thus coherent. This coherent multivibrator generator 52 operates at a relatively high rate (ten kilocycles) which is very much higher than the conveyor speed and which is higher than the sweep rate of the scanning CRT. A counter 53 receives these output pulses and counts to N (N being the number of stages in the shift register) and produces an output pulse on the Nth pulse which is applied to the reset terminal R of the control binary shifting its state to open the electronic switch in the coherent multivibrator and turn the multivibrator off. An output of coherent multivibrator 52 is applied to a delay circuit 54 so that N pulses from the multivibrator are applied to the shift register a selected time interval after the comparator has been operated and signals in the register translated.

[1] $\tau_d$ is preferably chosen to lie about midway between the wide and narrow pulse widths. Thus, $$\tau_d=\frac{TW_x+TW_y}{2}=\frac{\frac{X}{R}+\frac{Y}{R}}{2}=\frac{X+Y}{2R}\text{ milliseconds}$$

where $TW_x$ and $TW_y$ are the pulse widths corresponding to wide and narrow stripes, respectively, X and Y, are the width dimensions (in millimeters) of the wide and narrow stripes, respectively, and R is the speed of the light spot in millimeters per millisecond.

Figure 4:
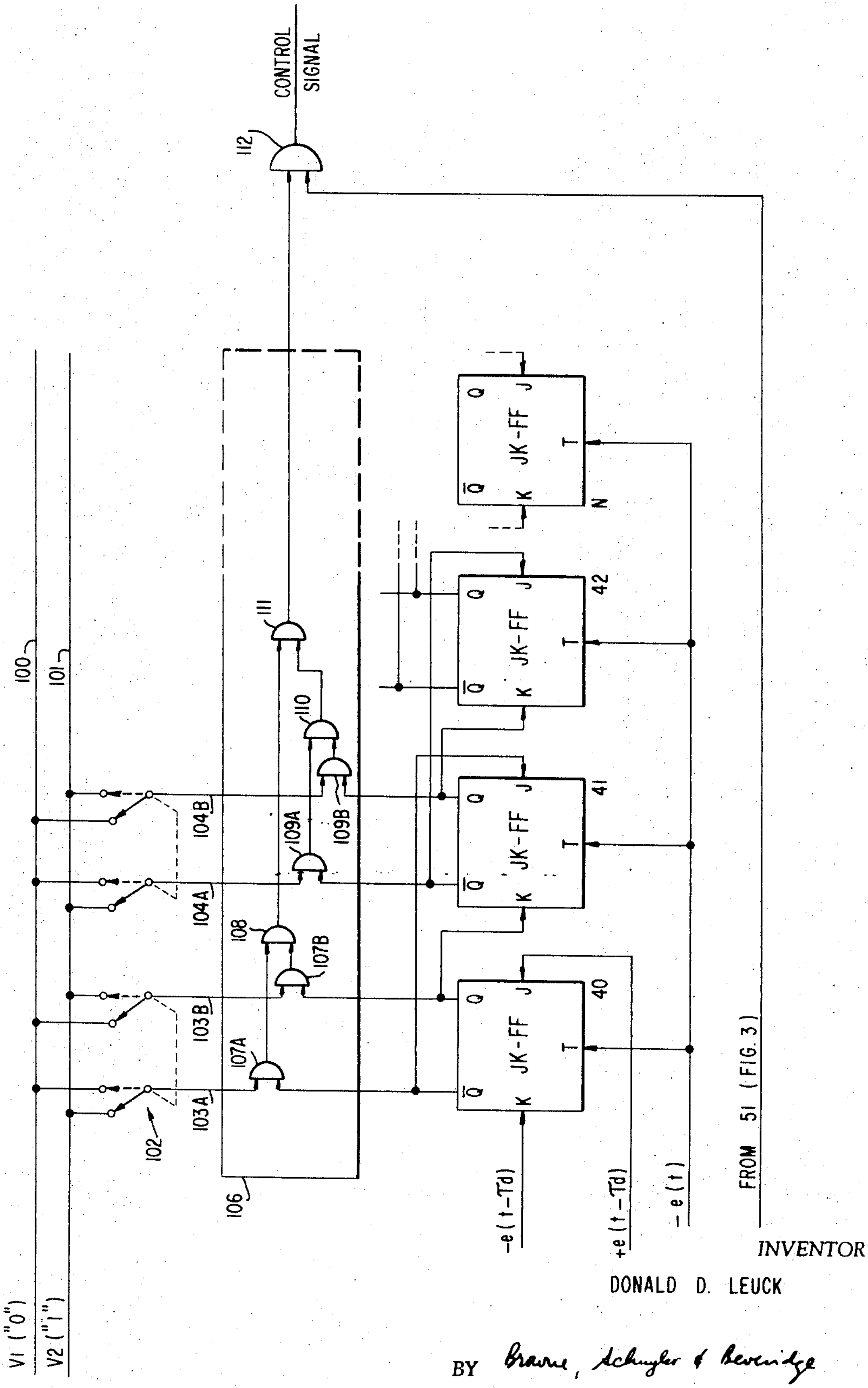
FIG. 4 shows the code translating and memory circuits.

FIG. 4 discloses the memory matrix and comparator circuit for translating binary numbers stored in the shift register.

A pair of busses 100 and 101 carry voltage levels $V_1$ and $V_2$ corresponding to a binary "zero" ("0") and a binary "one" ("1"). A set of double pole double throw switches 102 are adapted to be connected to either the "one" or the "zero" bus in order to set up a desired selected binary number on leads 103A–103B, 104A–104B corresponding to the number of stages in the shift register. A binary digit on leads 103A–103B is compared in logic circuit 106, which includes a chain of logic gates 107A, 107B, with the voltages on logical output terminals Q and Q of the first stage 40 of the shift register. If the signal appearing at terminals Q and Q of the flip flop 40 agree with the voltages on leads 103A and 103B (e.g. the memory), there will be a logical output from gate 108. A similar comparison is made for the succeeding stage in gates 109A, 109B and 110. The development of the logical chain for more than two stages is conventional. If there is agreement between the information setup on leads 103A, 103B, etc. with their corresponding stages of the shift register, there will be an output from logic gate 111.

If there is an output from gate 111, signifying that the code number printed on the article corresponds to the code number on leads 103 and 104, an output is applied to gate 112 along with the differentiated output of control binary 50, so that the actual readout control signal is produced following the sweep of the light spot across the stripes on the article.

Figure 6:
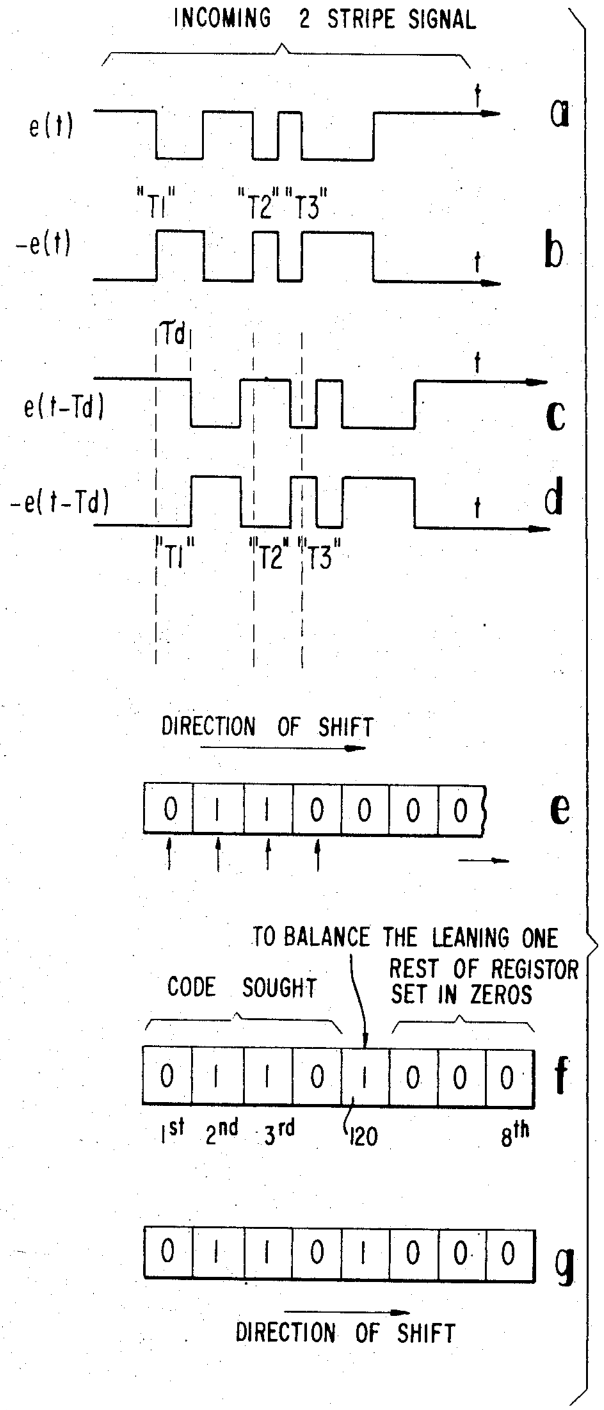

As shown in FIG. 6 an incoming two stripe signal consists of a narrow pulse and a wide pulse corresponding to a narrow stripe and a wide stripe, respectively. These pulses are inverted to obtain the complements $-e(t)$ thereof (FIG. 6*b*) and when $-e(t)$ is applied to terminal T of stages of the shift register at times $T_1$, $T_2$, $T_3$, . . . (FIG. 6*b*) transitions are induced on the positive excursions (subject to the conditions on the J–K input terminals). The delayed wave forms $e(t-\tau d)$ and $-e(t-\tau d)$ are applied to the logic terminals J and K of the first stage 40 of the shift register.

In the cleared or initial condition all stages of the register contain zero. At time $T_1$ the J input is high while the K input is low hence at time $T_1$ a "one" will be introduced into binary stage 40. At time $T_2$ the J input is high while the K input is low and a "one" will be impressed upon the first binary stage 40 while the "one" stored at time $T_1$ will be shifted to the second binary stage 41. At time $T_3$ J is low while K is high. Hence, a "zero" will be impressed or stored upon the first binary stage 40 while the previously stored information will be shifted one position further in the shift register. No further shifts will be introduced for the input shown as $-e(t)$ makes no further positive going transitions. Thus, the register would contain information as shown in FIG. 6*e*.

As shown and described a "one" will precede the stripe code information being shifted or stored in the shift register. This is due to the form of the waveform $e(t)$ taken at time $T_1$, and since this "one" is present for all numbers coded, it can be ignored as part of the comparison with standard or desired number. The easiest way to accomplish this is to set the desired code or number into the memory matrix or standard register and then set a "one" into the next position greater than the number of code stripes being checked. For example, in an 8 bit register using four code stripes the standard for a code such as 0110 would be set up as shown in FIG. 6*f*. The "one" in the fifth stage 120 of the control memory or standard is to balance the leading "one" due to the input wave form. The input data in the shift register would appear as in FIG. 6*g* and would compare directly with the control memory or standard.

Instead of supplying a series of N pulses to the shift register to clear same, each stage of the register may be adapted to be simultaneously cleared by application of a single clearing pulse such as from the output of control binary 50. In this case, the stages of the shift register would be somewhat more complex in requiring a clearing circuit. This clearing or resetting method is faster than the illustrated register clearing method and may be used where the time between each stripe pattern reading is short.

It will be appreciated that the binary number stored in the shift register may be applied directly to a computer for many purposes including inventory control, measurement of production rates, as well as for direct control over the articles for sorting purposes and the like.

While the invention has been described with reference to a particular embodiment, it is to be understood that modifications may be made by persons skilled in the art without departing from the spirit of the invention or from the scope of the claims.

I claim:

1. In an article processing system having means on the article providing a plurality of stripes in the form of a binary code, said stripes being of one selected width to constitute a binary "one" and of another selected width to constitute a binary "0,"

means for moving the articles along a path, a reading station along said path, said reading station including electro-optical means for scanning said stripes and producing a series of electrical pulses having a time period proportional to the width of said stripes, said electro-optical means including means for projecting a spot of light on said article and causing the light spot to traverse the stripes, means connected to said electro-optical means for simultaneously detecting and storing the information contained in said series of electrical pulses, including the first stage of a multistage shift register, with respect to each pulse, means for obtaining complement of said each pulse, means for delaying said each pulse and complement thereof equal amounts, the amount of delay being greater than the width of the narrower pulses and less than the width of the wider of said pulses, means for applying the delayed pulses to the first stage of said multistage shift register, whereby said wide pulses are entered into said first stage of said shift register as a binary "one" and said narrow pulses are entered into said first stage of said multistage shift register as a binary "0," respectively, and said complement of a succeeding pulse in a series causes the binary digits stored in said first stage to be transferred to the next succeeding stage.

2. The invention defined in claim 1 wherein said article is a tubular container made of a material having a reflective surface, a band of coating material on said surface having a color contrasting with the color of said stripes, said flying light spot being caused to traverse across said band of coating material and axially of said tubular container, and, an optical detector positioned to pick up maximum reflected light from the area of said band of material and minimum reflected light from the material of which said container is made.

3. In an article processing system having means on the article providing a plurality of stripes in the form of a binary code, said stripes being of one selected width to constitute a binary "one" and of another selected width to constitute a binary "0,"

means for moving the articles along a path, a reading station along said path, said reading station including electro-optical means for scanning said stripes and producing a series of electrical pulses having a time period proportional to the width of said stripes, said electro-optical means including means for projecting a spot of light on said article and causing the light spot to traverse the stripes, means connected to said electro-optical means for simultaneously detecting and storing the information contained in said series of electrical pulses, said means for simultaneously detecting and storing including the first stage of a multistage shift register, with respect to each pulse, means for obtaining the complement of said each pulse, means for delaying the said each pulse and the complement thereof equal amounts, and means for applying the delayed pulses and said complements to the first stage of said multistage shift register, binary code translating means operated upon termination of said light spot traversal of said stripes for translating the binary coded information stored in said multistage shift register into control information, and a coherent multivibrator operated upon termination of said light spot traversal of said stripes for producing a series of clearing pulses equal in number to the number of stages in said multistage shift register, delay means connecting said coherent multivibrator to said multistage shift register and delaying said clearing pulses a selected time interval to allow said binary code translating means to translate the binary coded information into control information.

4. The invention defined in claim 3 including counter means connected to receive pulses from said coherent multivibrator to produce an output upon delivery of the last clearing pulse to said shift register and means controlled by the output of said counter means for disabling said coherent multivibrator.

5. The invention defined in claim 4 wherein said means controlled by the output of said multivibrator comprises a bistable switch operated to one stable state by a signal produced upon termination of said light spot traversal and to its other stable state by the output of said counter means.

6. The invention defined in claim 5 including means coupled to said bistable switch for differentiating the output thereof, said differentiated output constituting the signal for initiating the operation of said means operated on termination of said light spot traversal of said stripes for translating the binary information stored in said multistage shift register into control information.

7. The invention defined in claim 3 wherein said means operated on a termination of said light spot traversal includes a pair of busses, and one bus carrying a voltage corresponding to a binary one and the second of said busses carrying a voltage corresponding to a binary zero, first memory circuit means connected to said busses in accordance with a selected permutation pattern corresponding to a selected permutation pattern of stripes on the article, second memory circuit means connected to receive the outputs of said multistage shift register, logic circuit means connected to said first memory circuit means and said second memory circuit means, code permutation position for code permutation position, and means actuated when said logic circuit means detects the concurrences of a permutation pattern established by said first memory circuit means with a permutation pattern in said multistage shift register.

8. In articles of manufacture wherein the article is tubular and annular in shape, the improvement in identification of the articles comprising, a series of spaced markings on the articles constituting a binary code assigned to the article, each marking having one of two selected width dimensions corresponding to a selected binary code permutation, respectively, one of said selected width dimensions constituting a binary digit having a given binary significance and the other of said selected width dimension being narrower than the first-mentioned one of said selected width dimensions to constitute a binary digit having a different binary significance, said markings being narrow stripes circumferentially extending about said article and each said stripe terminating short of completely encircling said article to leave a gap between the ends of said stripes so that slightly skew printed narrower lines do not appear as a line having a different binary significance.

9. In an article processing system having means on the article forming a permutatable sequence of N bit markings of a permutative code so that for any permutated sequence there is a bit marking for each permutative position, the improvements which comprise, each bit marking having a selected physical-linear dimension along a given marking parameter, said physical dimension corresponding to a selected code significance, means for scanning all of said N bit markings in sequence from first to last and producing a sequence of N electrical pulses in the sequence of said marking, each electrical pulse having a time period proportional to the selected physical dimension of the corresponding marking, and a multistage shift register means having a first stage for simultaneously decoding and storing the information carried by said sequence of electrical pulses.

References Cited

UNITED STATES PATENTS

| | | | |
|---|---|---|---|
| 2,899,132 | 8/1959 | Orthuber | 235—61.6 |
| 3,211,470 | 10/1965 | Wilson | 283—56 XR |
| 3,246,751 | 4/1966 | Brenner et al. | 340—172.5 XR |
| 3,267,431 | 8/1966 | Greenberg et al. | 340—172.5 |
| 3,289,172 | 11/1966 | Towle | 340—172.5 |
| 3,328,766 | 6/1967 | Burns et al. | 340—172.5 |
| 2,870,429 | 1/1959 | Hales | 340—172 XR |
| 2,228,782 | 1/1941 | Sharples | 235—61.115 |
| 3,359,405 | 12/1967 | Sundblad | 235—61.115 |

PAUL J. HENON, Primary Examiner

H. E. SPRINGBORN, Assistant Examiner

U.S. Cl. X.R.

40—2, 310

UNITED STATES PATENT OFFICE

CERTIFICATE OF CORRECTION

PATENT NO. : 3,543,241

DATED : November 24, 1970

INVENTOR(S) : Donald D. Leuck

It is certified that error appears in the above-identified patent and that said Letters Patent are hereby corrected as shown below:

Col. 1, line 32, "strip" should be --stripe--; Col. 1, line 32, after "system" insert --and apparatus and, more particularly a stripe coding system--; Col. 3, line 20, "tthe" should be --the--; Col. 3, line 35, after "Thus" insert a comma --(,)--; Col. 3, line 72, after "receives" insert --articles--; Col. 4, line 68, "the" (first occurr should be --The--; Col. 5, line 12, period "(.)" shouldb a comma --(,)--.

Signed and Sealed this

Tenth Day of August 1976

[SEAL]

*Attest:*

RUTH C. MASON
*Attesting Officer*

C. MARSHALL DANN
*Commissioner of Patents and Trademarks*